(12) United States Patent
Bereznai

(10) Patent No.: US 9,587,758 B2
(45) Date of Patent: Mar. 7, 2017

(54) VALVE ARRANGEMENT

(71) Applicant: BERY INTELLECTUAL PROPERTIES, Budapest (HU)

(72) Inventor: József Bereznai, Budapest (HU)

(73) Assignee: BERY INTELLECTUAL PROPERTIES, Budapest (HU)

( * ) Notice: Subject to any disclaimer, the term of this patent is extended or adjusted under 35 U.S.C. 154(b) by 0 days.

(21) Appl. No.: 14/417,048

(22) PCT Filed: Jul. 22, 2013

(86) PCT No.: PCT/HU2013/000073
§ 371 (c)(1),
(2) Date: Jan. 23, 2015

(87) PCT Pub. No.: WO2014/016628
PCT Pub. Date: Jan. 30, 2014

(65) Prior Publication Data
US 2015/0211655 A1    Jul. 30, 2015

(30) Foreign Application Priority Data

Jul. 23, 2012    (HU) ..................................... 1200436

(51) Int. Cl.
*F16K 17/26*    (2006.01)
*F16K 31/385*    (2006.01)
(Continued)

(52) U.S. Cl.
CPC ............... *F16K 31/385* (2013.01); *F16F 9/34* (2013.01); *F16K 15/06* (2013.01); *Y10T 137/7764* (2015.04); *Y10T 137/7769* (2015.04)

(58) Field of Classification Search
CPC .......... F16K 31/385; F16K 15/06; F16F 9/34; Y10T 137/7764; Y10T 137/7769;
(Continued)

(56) References Cited

U.S. PATENT DOCUMENTS 2,896,863 A * 7/1959 Shames .................. E03C 1/084
239/109
2,902,224 A * 9/1959 Shames .................. E03C 1/084
239/428.5
(Continued)

FOREIGN PATENT DOCUMENTS

DE    10 2010 030 735 A1    1/2012
EP    0 349 816 A2    1/1990
(Continued)

OTHER PUBLICATIONS

International Search Report issued in PCT/HU2013/000073, mailed on Nov. 18, 2013.
(Continued)

*Primary Examiner* — Jessica Cahill
(74) *Attorney, Agent, or Firm* — Birch, Stewart, Kolasch & Birch, LLP

(57) ABSTRACT

Valve arrangement for ensuring different amount of medium flow-through comprising at least two chambers (6,7) separated by a limiting wall (3) provided with a through-opening (1). An insertion piece (2) in the through-opening (1) is able to move transversally and the cross-section of its elongated middle portion (4) corresponds to that of the through-opening (1). At least at one end of the insertion piece (2) a closing head (5) is provided. A form-fitting (8) between the closing head (5) and the limiting wall (3) ensures a first closed state thereby a first amount of flow-through from a chamber (6) being on one side of the through-opening (1) to the chamber (7) being on the other side of it when the longitudinal movement of the insertion piece (2) is limited as the closing head (5) abuts against the limiting wall (3) at the through-opening (1).

20 Claims, 3 Drawing Sheets

(51) Int. Cl.
 *F16K 15/06* (2006.01)
 *F16F 9/34* (2006.01)
(58) Field of Classification Search
 CPC ......... Y10T 137/7783; Y10T 137/7792; Y10T 137/7847; Y10T 137/7866; Y10T 137/7771; Y10T 137/778
 USPC ............................ 137/513, 513.5, 513.3, 512
 See application file for complete search history.

(56) References Cited

U.S. PATENT DOCUMENTS

| | | | | |
|---|---|---|---|---|
| 3,014,665 | A * | 12/1961 | Shames | E03C 1/084 239/107 |
| 3,561,472 | A * | 2/1971 | Lamb | F16K 15/14 137/513.3 |
| 3,683,957 | A * | 8/1972 | Sands | F16K 17/26 137/460 |
| 4,174,731 | A * | 11/1979 | Sturgis | F16K 17/26 137/498 |
| 4,423,800 | A * | 1/1984 | Kobiske | F16F 9/3415 137/513.3 |
| 4,456,029 | A * | 6/1984 | McCrum | F16K 17/30 137/498 |
| 4,562,960 | A * | 1/1986 | Marty | E03C 1/084 138/45 |
| 4,890,640 | A * | 1/1990 | King, Sr. | F16K 15/141 137/512.4 |
| 5,071,071 | A * | 12/1991 | Chao | E03C 1/084 239/428.5 |
| 5,836,349 | A * | 11/1998 | Kimberly | F16K 17/19 137/493.8 |
| 6,619,324 | B2 * | 9/2003 | Yamada | E04G 23/0203 137/512.15 |
| 6,789,567 | B2 * | 9/2004 | Meyer | F16K 15/142 137/269.5 |
| 7,594,519 | B2 * | 9/2009 | Hart | G05D 7/012 138/43 |
| 8,348,227 | B2 * | 1/2013 | Zoller | G05D 7/0133 137/504 |
| 2011/0005618 | A1 * | 1/2011 | Lin | B05B 1/3006 137/516.25 |

FOREIGN PATENT DOCUMENTS

| | | |
|---|---|---|
| GB | 2 273 795 A | 6/1994 |
| WO | WO 2005/004684 A1 | 1/2005 |
| WO | WO 2007/105020 A1 | 9/2007 |

OTHER PUBLICATIONS

PCT/ISA/237—Issued in PCT/HU2013/000073, mailed on Nov. 18, 2013.

* cited by examiner

VALVE ARRANGEMENT

The invention relates to a valve arrangement for ensuring different amount of medium flow-through, the arrangement comprising at least two chambers for receiving the medium, a limiting wall for separating the chambers and a through-opening formed in the limiting wall for ensuring the flow-through of the medium.

There are known solutions in which a main valve used for allowing flow-through in a greater amount is controlled by auxiliary valves. An example to this is described in patent application U.S. Pat. No. 7,175,154. However, the solution described here uses pistons as auxiliary elements which are rather complicated and expensive.

The aim of the present invention is to ensure at least the same functioning by using a simple element instead of the piston structure.

It has been realized that by placing an insertion piece in the through-opening this aim can be achieved.

With the present invention a valve arrangement according to the preamble is provided in which an insertion piece is placed in the through-opening, the insertion piece is able to move transversally in the through-opening relative to the limiting wall, it has an elongated middle portion having a cross-section which is entirely covered by the cross-section of the through-opening, and at least at one longitudinal end of the insertion piece a closing head is provided which is unable to pass through the through-opening, and a form-fitting is provided between the closing head and the limiting wall ensuring a first closed state making a first amount of flow-through possible from a chamber being on one side of the through-opening to the chamber being on the other side of it when the longitudinal movement of the insertion piece is limited as the closing head abuts against the limiting wall at the flange of the through-opening.

The invention will be described with reference to the attached drawings in which.

Figure 1:
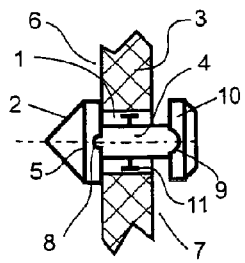
FIGS. 1-6 show different embodiments of the invention.

In FIG. 1 insertion piece 2 placed in the through-opening 1 is shown in an arrangement where a closing head 5 is formed at one end of the elongated middle portion 4 of the insertion piece 2. The closing head 5 is not able to pass through the through-opening 1 and depending on the flow direction it can ensure partial closure as it abuts on limiting wall 3 in which the through-opening is formed. At the other end of the elongated middle portion 4 a closing head 10 is provided for limiting the possibility of movement. In this embodiment a drain hole 9 is formed on closing head 10 ensuring reversed flow direction in order to make pressure compensation of the chambers and self-cleaning possible. Elongated middle portion 4 has a cross-section which is entirely covered by the cross-section of the through-opening 1. This ensures that insertion piece 2 can freely move in through-opening 1. Between closing head 5 and limiting wall 3 form-fitting 8 e.g. one or more small openings, gaps, etc. is provided ensuring a first closed state for a first amount of medium flow-through from a chamber being on a first side to a chamber being on the other side of the through-opening 1.

Figure 2:
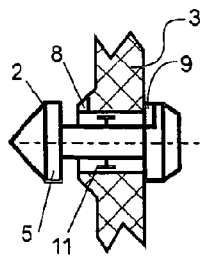

In FIG. 2 a form-fitting 8 is provided on limiting wall 3 in order to make partial flow-through possible in compliance with form-fitting 8 when insertion piece 2 moves, closes as closing head 5 and limiting wall 3 meet.

Figure 3:
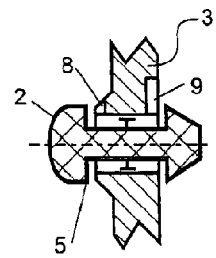

In FIG. 3 form-fitting 8 and drain hole 9 is provided on the advantageously stiff limiting wall 3. In this case insertion piece 2 is formed from a soft material (rubber or other resilient material). However, it may have a rigid frame provided with some resilient coating.

Figure 4:
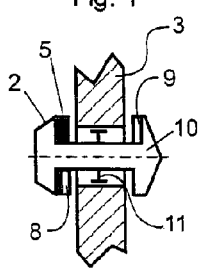

In FIG. 4 form-fitting 8 is provided on an advantageously resilient intermediate piece which can be a pad, a sheet, an O-ring, etc. The elongated middle portion 4 is provided with a guiding element 11 and the drain hole 9 is formed on closing head 10 which is shown in an intermediate position in this Figure.

Figure 5:
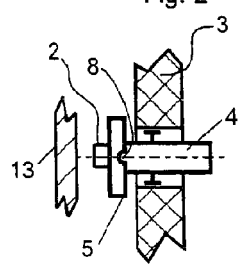

In FIG. 5 an arrester 13 is provided. In this case insertion piece 2 does not abut against limiting wall 3. Its motion is limited by a different component part.

Different from the embodiments shown in FIGS. 1-5 form-fitting 8 and drain hole 9 may be provided on closing head 5 and also on limiting wall 3 or even on both or combination of them.

In any of the embodiments shown in FIGS. 1-5 the insertion piece 2 and limiting wall 3 may be formed from rigid or resilient material by means of which the size of the regulating hole can be changed depending on the pressure, thus that the size of the regulating hole can be made adaptive.

Figure 6:
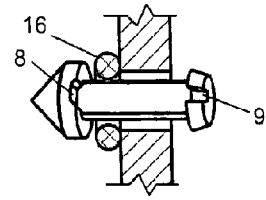

FIG. 6 shows an embodiment in which advantageously a resilient sealing element e.g. O-ring, washer or other suitably profiled element is inserted between two rigid closing surfaces in order to make their matching more perfect.

Figure 7A:
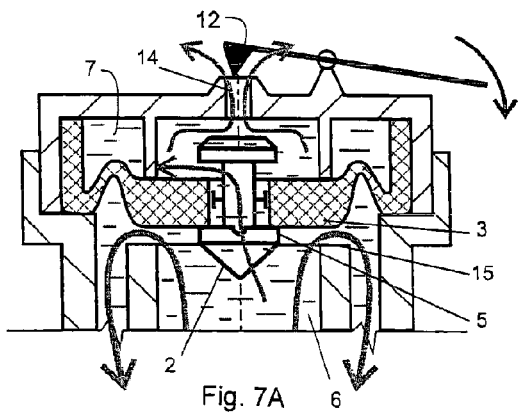
FIGS. 7A-7B show the operation of an embodiment of the invention provided with a control element.

As it is shown in FIG. 7A chamber 7 is opened through control hole 14 by means of control element 12 so insertion piece 2 closes to limiting wall 3 as a result of the overpressure present in chamber 6. When closing head 5 and limiting wall 3 meet, the through-flow capacity of form-fitting 8 ensuring a partial through-flow is less than that of the control hole 14. Consequently the pressure in chamber 7 is less than in chamber 6. As a result of the overpressure generated in chamber 6 limiting wall 3 and also insertion piece 2 move away from closing hole 15 and the valve opens.

Figure 7B:
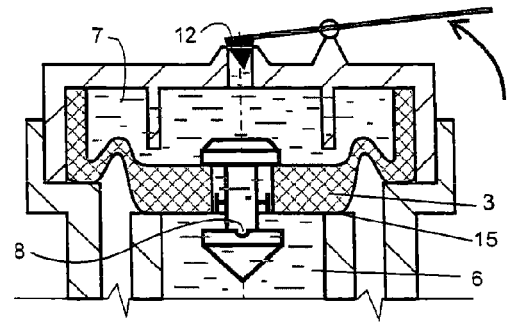

In FIG. 7B the control element 12 is closed in consequence of which chamber 7 is filled up through form-fitting 8 and the pressure in it becomes equal to the pressure in chamber 6. Due to the ratio between the surfaces of pressure limiting wall 3 is pressed against closing hole 15 and the valve closes. Because of the overpressure caused in this manner the closing element is compressed—due to its resilience—in a greater extent than normal therefore the capacity of chamber 7 is increased for a moment. Then after closing the optimal shape of the closing element is restored and the overfilled chamber 7 is equalized by means of through-opening 1. As a result of this the direction of flow changes, insertion piece 2 starts moving while closing head 5 moves away from limiting wall 3 and makes flow-through possible in a greater extent at form-fitting 8 and the medium flowing through in the opposite direction washes out the contaminants accidentally present in form-fitting 8. This process may also happen due to gravitation. A considerable advantage of the present invention is that form-fitting 8 becomes clean much easier since the walls move away from each other thereby the contaminants accidentally wedged in can be removed so self-cleaning capability of the system is ensured by the reversed flow.

Figure 8:
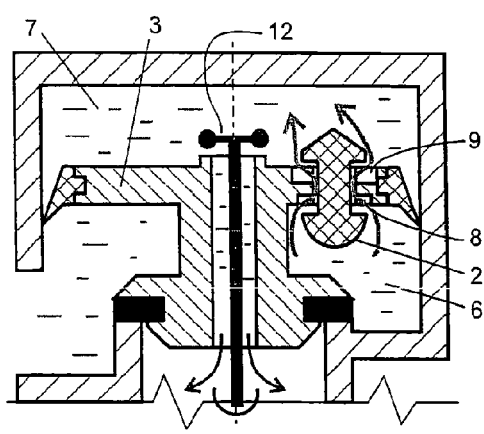
FIGS. 8-10 show the operation of further embodiments of the invention.

In FIG. 8 a valve arrangement is shown in which insertion piece 2 is built in a piston having a stiff body, form-fitting 8 or drain hole 9 can be formed in limiting wall 3. Position of the control unit is the same as in FIG. 3.

Figure 9:
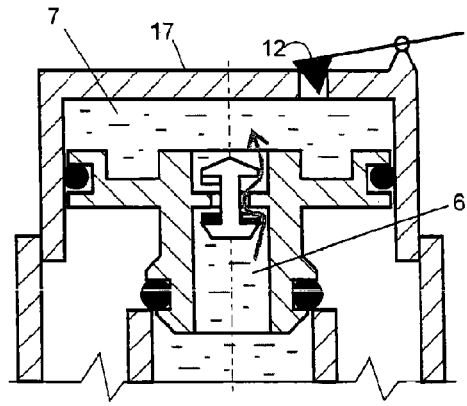

In FIG. 9 a valve arrangement can be seen in which chamber 6 is positioned opposite the closing direction, insertion piece 2 and through-opening 1 are advantageously placed in the line of symmetry of the closing element.

Figure 10:
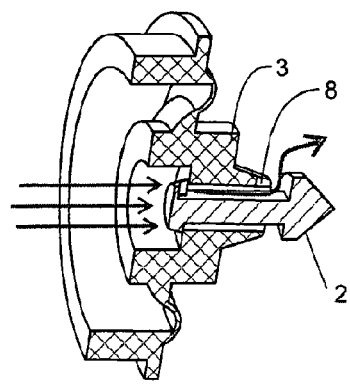

In FIG. 10 insertion piece 2 is applied in a frequently used resilient closing membrane element. A significant advantage of the invention can be seen here, i.e. in addition to self-cleaning capability and adaptability it can be realized in a very simple manner.

Figure 11:
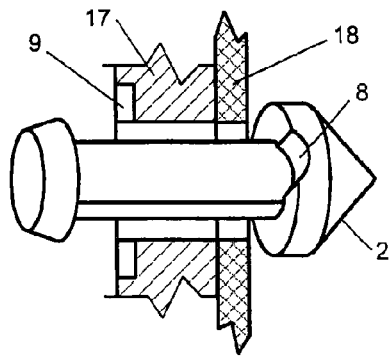
FIGS. 11-18 show further embodiments of the invention.

The embodiment shown in FIG. 11 comprises a stiff element 17 and a resilient surface 18 ensuring a pressure tight well closing surface.

Figure 12:
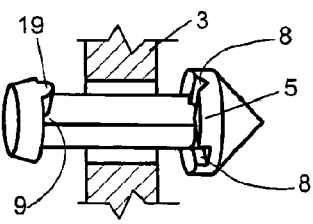

Form-fitting 8 may be realized as it is shown in FIG. 12. However, the size and geometrical shape of form-fitting 8 between limiting wall 3 and closing head 5 may be different form the one shown in the Figure. There may be one or more form-fitting 8 provided on either of the two surfaces. Here a spacer 19 is used in order to form drain hole 9.

Figure 13:
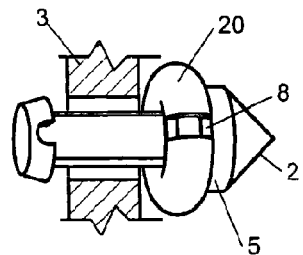

As it is shown in FIG. 13 form-fitting 8 is provided on elastic material 20. In the Figure it is an O-ring but it can be any other suitably profiled element.

Figure 14:
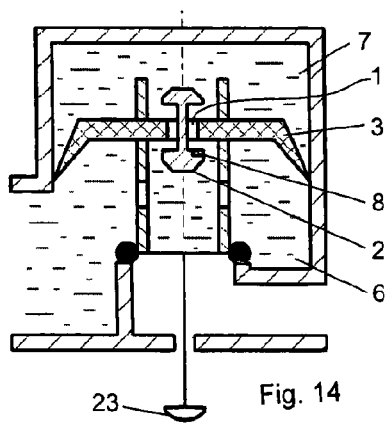

In FIG. 14 the valve arrangement is provided with a push-button structure 23. Insertion piece 2 and through-opening 1 are formed in a piston mechanism which is moved mechanically. In an alternative embodiment it may be operated electrically.

Figure 15:
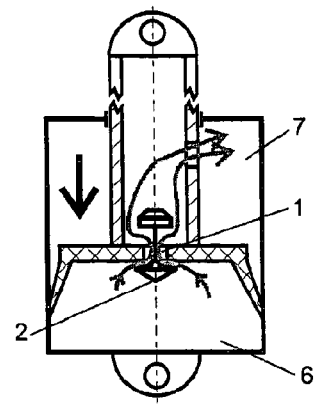

In FIG. 15 a hydropneumatic unit is shown in which position of the insertion piece 2 and through-opening 1 of the control unit makes different amount of flow-through possible—depending on the direction of movement of the piston in the cylinder—which can partially determine the velocity of movement of the piston structure.

Figure 16:
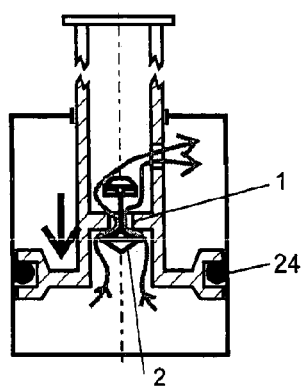

In the hydropneumatic valve arrangement shown in FIG. 16 the closing element is an O-ring placed between the piston and the cylinder wall, insertion piece 2 and through-opening 1 are positioned in a mechanically well sheltered place.

Figure 17:
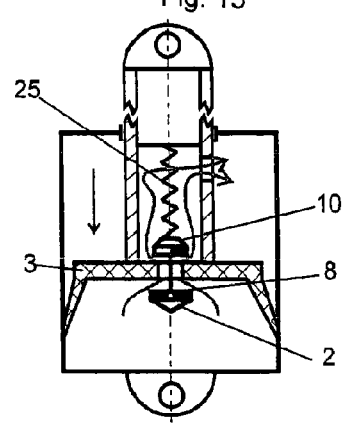

In the hydropneumatic valve arrangement of FIG. 17 insertion piece 2 is supported by a force storing element 25 the essence of which is that insertion piece 2 closes to limiting wall 3 only in case of a certain amount of medium flow-through. As a result of this the impedance of through-flow significantly increases consequently the velocity of movement of the piston is limited. This solution is suitable in cases when deceleration is needed depending on the velocity of flow-through. Force storing element may be provided collectively or separately from both directions.

Figure 18:
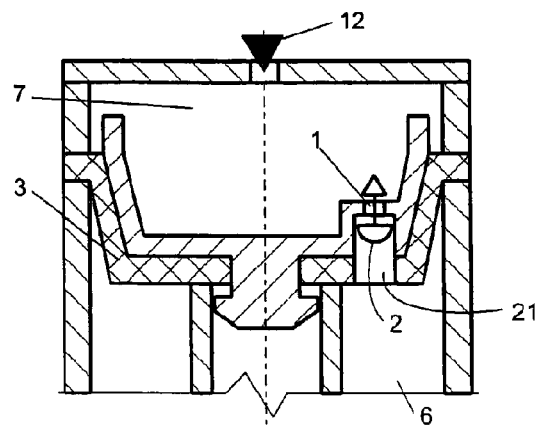

In FIG. 18 a valve arrangement is shown in which the control unit including insertion piece 2 and through-opening 1 is placed out of the main flow directions, it is enclosed in a well sheltered place 21 so that it does not get damaged and contaminated easily. Alternatively, it can be positioned in a partially closed place. Another advantage of the invention is that it can be installed anywhere in the system.

Figure 19:
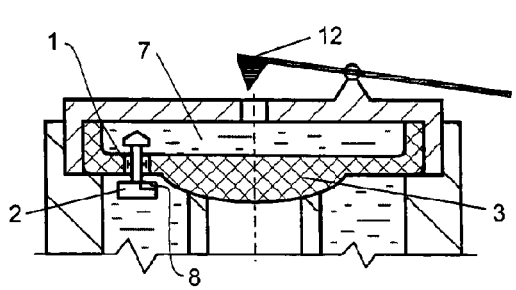
FIGS. 19-20 show embodiments provided a with control element.

In the embodiment shown in FIG. 19 a closing valve arrangement can be seen which is mainly used in industry. Limiting wall 3 is a membrane, the control unit including insertion piece 2 and through-opening 1 is positioned in the membrane of limiting wall 3. Advantageously, in this case the bore-hole is also bushed.

Figure 20:
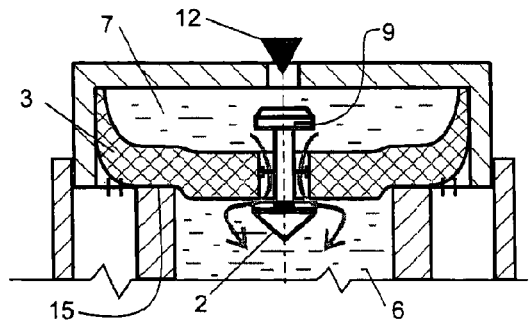

FIG. 20 shows the overpressure at the time of closing. Closing hole 15 and limiting wall 3 are pressed together and deformed to a great extent, the sealing element is partially deformed and chamber 7 is overfilled.

Figure 21:
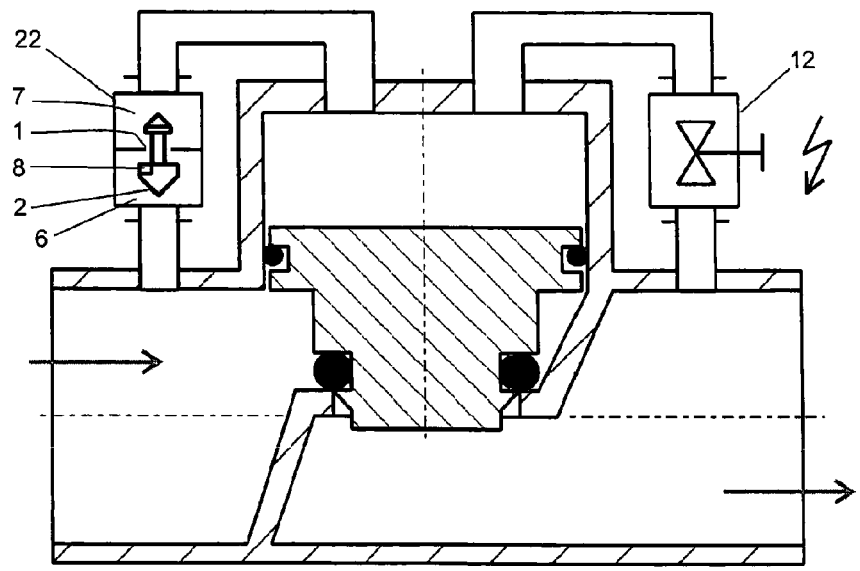
FIG. 21 shows a compound embodiment provided with a control unit.

In FIG. 21 the control unit including controlling insertion piece 2 and through-opening 1 are built in a separate control unit 22. It is mainly used in industrial valve applications. The advantage of this is that it can be installed anywhere and can be maintained easily without disassembling the main valve. It is especially advantageous in case of dangerous liquids. Control element 12 may be mechanical or electro-mechanical. Control unit 22 can be combined with an additional valve or magnetic valve in order to make more reliable and safe operation mainly in case of valves used in industry.

Solutions described with reference to FIGS. 1-21 may be built in magnetic valves or other electromechanical valves, hydraulic and pneumatic valves or shock absorbers.

Various kinds of medium can be used in the different embodiments of the invention described, e.g. the medium may be liquid or gas.

The invention claimed is:

1. A valve arrangement for ensuring a different amount of medium flow-through, the arrangement comprising:
    at least two chambers for receiving the medium,
    a limiting wall for separating the chambers and a through-opening formed in the limiting wall for ensuring the flow-through of the medium,
    an insertion piece in said through-opening, said insertion piece transversally movable in said through-opening relative to said limiting wall, the insertion piece having an elongated middle portion having a cross-section which is entirely covered by a cross-section of said through-opening, and a first closing head which is unable to pass through said through-opening at a first end of the insertion piece,
    a form-fitting between the first closing head and said limiting wall ensuring a first closed state allowing a first amount of flow-through possible from a first chamber to a second chamber when the longitudinal movement of said insertion piece is limited as the first closing head abuts against said limiting wall,
    a second closing head, which is unable to pass through in operation said through-opening and which is different in shape from the first closing head at a second end of said insertion piece, and
    a drain hole between said second closing head and said limiting wall ensuring a second closed state allowing a second amount of flow-through possible from the second chamber to the first chamber when the longitudinal movement of said insertion piece is limited as said second closing head abuts against said limiting wall.

2. The arrangement according to claim 1 wherein said form-fitting or said form-fitting and also a drain hole are formed on said limiting wall.

3. The arrangement according to claim 1 wherein the insertion piece is made of a resilient material.

4. The arrangement according to claim 3 wherein said form fitting or said four-fitting and also a drain hole are formed on said limiting wall.

5. The arrangement according to claim 1 wherein said elongated middle portion extends to the second end of said insertion piece, and behind said first closing head an arrester is provided the distance of which from said limiting wall in the direction of the longitudinal axis of said through-opening is less than the length of said elongated middle portion.

6. The arrangement according to claim 5 wherein said form-fitting or said form-fitting and also a drain hole are formed on said limiting wall.

7. The arrangement according to claim 1 wherein said elongated middle portion has a circular or polygonal cross-section.

8. The arrangement according to claim 7 wherein said form-fitting or said form-fitting and also a drain hole are formed on said limiting wall.

9. The arrangement according to claim 1 wherein an intermediate piece is placed between the limiting wall and the first closing head.

10. The arrangement according to claim 9 wherein said form-fitting or said form-fitting and also a drain hole are formed on said limiting wall.

11. The arrangement according to claim 9 wherein said intermediate piece is a washer made of metal.

12. The arrangement according to claim 11 wherein said form-fitting or said form-fitting and also a drain hole are formed on said limiting wall.

13. The arrangement according to claim 9 wherein said intermediate piece is a resilient washer or sealing element.

14. The arrangement according to claim 13 wherein said form-fitting or said form-fitting and also a drain hole are formed on said limiting wall.

15. The arrangement according to claim 1 wherein, in order to ensure said form-fitting between said first closing head and said limiting wall, at least one of the surfaces from the surface of the first closing head abutting the limiting wall and the surface of said limiting wall is roughened or has deformations, grooves, recesses, protrusions formed in it.

16. The arrangement according to claim 15 wherein said recesses or protrusions on the surface are formed by applying casting, pressing or rolling methods.

17. The arrangement according to claim 15 wherein said deformations, grooves, and recesses are formed by applying scratching, milling, grinding or laser machining methods.

18. The arrangement according to claim 17 wherein said recesses or protrusions on the surface are formed by applying casting, pressing or rolling methods.

19. A valve arrangement for ensuring a different amount of medium flow-through, the arrangement comprising:
at least two chambers for receiving the medium;
a limiting wall for separating the chambers;
a through-opening formed in the limiting wall for ensuring the flow-through of the medium;
an insertion piece in said through-opening, insertion piece having:
an elongated middle portion;
a first closing head at a first end of the middle portion having a diameter larger than a diameter of the through opening; and
a second closing head at a second end of the middle portion having a diameter larger than a diameter of the through opening;
a form-fitting in the first closing head, the form-fitting being a channel formed in a bottom surface of the first closing head, the form-fitting allowing a first flow of the medium between the two chambers when the first closing head abuts the limiting wall; and
a drain hole, the drain hole allowing a second flow of the medium between the two chambers when the second closing head abuts the limiting wall.

20. The arrangement according to claim 19, wherein the drain hole is a channel formed in limiting wall.

* * * * *